No. 797,026. PATENTED AUG. 15, 1905.
H. F. STOWELL.
SAFETY PIN.
APPLICATION FILED APR. 29, 1904.
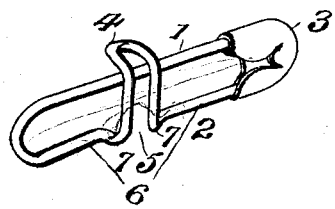
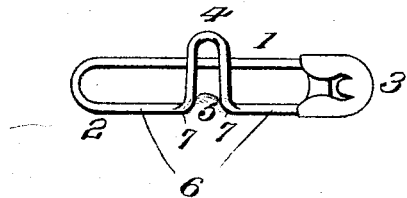
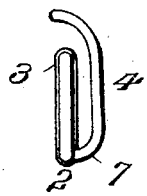
Witnesses
Inventor
Henry F. Stowell
By Benj. R. Catlin
Attorney

UNITED STATES PATENT OFFICE.

HENRY FOWLER STOWELL, OF ROCHESTER, NEW YORK.

SAFETY-PIN.

No. 797,026.

Specification of Letters Patent.

Patented Aug. 15, 1905.

Application filed April 29, 1904. Serial No. 205,532.

*To all whom it may concern:*

Be it known that I, HENRY FOWLER STOWELL, a resident of Rochester, in the county of Monroe and State of New York, have invented certain new and useful Improvements in Safety-Pins; and I do hereby declare the following to be a full, clear, and exact description of the invention, such as will enable others skilled in the art to which it pertains to make and use the same.

The invention relates to so-called "safety-pins" and to that class in which the member opposite the pin proper is provided with a hook to engage with or to be engaged by a tape, strap, eye, or the like.

The objects of the invention are to simplify the construction and cheapen the cost of manufacture, to increase the rigidity of the hook member, to provide a guard against disengagement, and to secure other advantages.

In the accompanying drawings, which form a part of this specification, Figure 1 is a perspective of the improved device. Fig. 2 is a side elevation. Fig. 3 is an end elevation.

Numeral 1 denotes the pin proper of a so-called "safety-pin," and 2 a pin-supporting and guard or shield supporting member. 3 denotes the guard or shield for the pin-point. These parts are as usual, except that the member or body 2 is provided with a hook 4 of novel construction. Said hook is integral with the member 2 and is made with an opening at 5 separating the two side members of the hook, which heretofore in devices of this general character made of wire have been twisted together. The present construction in this respect affords a sufficiently wide bearing for the usual supporting-tape of men's drawers, for example, and one less likely to wear and tear said tape than a narrower hook of twisted wire. It has the further effect to stiffen the parts 6 of the pin-supporting member, since the bends 7 of the hook separated from each other, as shown, shorten the parts 6 and increase their relative rigidity. In some cases these bends 7 will be situated below the parts 6 of the pin-supporting member or body and will be thereby situated farther from the pin proper, and receptacles for tape will thus be provided at a greater distance from the point of the hook and from the said pin. This modification renders the function of the overhanging of the hook of less importance, but is not my preferred form. As shown in the drawings, the parts 7 are situated in a plane at right angles to a plane passing through the body and the pin proper of the article, whereby a seat for a tape is provided in close proximity to the body. The main part of the hook is situated in a plane parallel to that passing through the body and pin proper and at a distance from it, the free end of the hook being at no point in contact with the pin. By this construction provision is made for the ready engagement of a tape with the hook, which is further facilitated by the fact that the hook is made narrower as compared with the length of the body.

In use the pin is secured to a garment or fabric in the usual way, and the tape or the like is then passed over the hook, as indicated. To facilitate the initial engagement and also to seal it—that is, to prevent the accidental escape of the tape, eye, or strap from the hook—the latter may be made sufficiently long and bent back to or beyond a plane passing through the pin and member 2 and so as to overhang the pin, as shown in Figs. 1 and 3. As in this case the hook extends from member 2 beyond the pin, the latter does not interfere with the engagement of the hook with a tape or the like, and, further, when such engagement has been effected the outer end of the hook bent over the pin is in contact with or near the garment or object to which it is secured, thus sealing the escape from the hook. The hook may also be made longer than the distance between the body and pin proper by extending it below the body or in direction away from the pin, as illustrated in Fig. 4.

It is obvious that the safety-pin with the hook can be arranged and used to hold two garments or the like in proper relation whatever the direction of the pull on the hook.

Having described the invention, what I claim is—

In a safety-pin, a pin proper, and a pin-supporting body provided with a hook situated at one side of a plane passing through the pin and body and out of contact with the pin, the hook being longer than the distance between the pin and the body, said hook extending from said body beyond the pin and bent to said plane whereby its free end overhangs the pin at a distance therefrom.

In testimony whereof I have signed this specification in the presence of two subscribing witnesses.

HENRY FOWLER STOWELL.

Witnesses:
 JAMES L. HOTCHKISS,
 JAMES COCHRANE.